US012123246B2

(12) United States Patent
Herthan et al.

(10) Patent No.: US 12,123,246 B2
(45) Date of Patent: Oct. 22, 2024

(54) METHOD FOR THE OPERATION OF A MOTORIZED FLAP ARRANGEMENT

(71) Applicant: Brose Fahrzeugteile SE & Co. Kommanditgesellschaft, Bamberg, Bamberg (DE)

(72) Inventors: Bernd Herthan, Michelau (DE); Manfred Stenzel, Bamberg (DE); Daniel Steiner, Frankenblick (DE); Maximilian Rau, Coburg (DE)

(73) Assignee: Brose Fahrzeugteile SE & Co. Kommanditgesellschaft, Bamberg (DE)

( * ) Notice: Subject to any disclaimer, the term of this patent is extended or adjusted under 35 U.S.C. 154(b) by 146 days.

(21) Appl. No.: 17/746,114

(22) Filed: May 17, 2022

(65) Prior Publication Data

US 2022/0364406 A1 Nov. 17, 2022

(30) Foreign Application Priority Data

May 17, 2021 (DE) ..................... 10 2021 112 656.8

(51) Int. Cl.

*E05F 15/00* (2015.01)
*E05F 15/73* (2015.01)
*E05F 15/611* (2015.01)

(52) U.S. Cl.

CPC ............ *E05F 15/73* (2015.01); *E05F 15/611* (2015.01); *E05Y 2201/434* (2013.01); *E05Y 2400/31* (2013.01); *E05Y 2400/36* (2013.01); *E05Y 2400/44* (2013.01); *E05Y 2400/45* (2013.01); *E05Y 2900/531* (2013.01)

(58) Field of Classification Search

CPC ......... E05F 15/73; E05F 15/611; E05F 15/63; E05F 15/627; E05F 15/70; E05Y 2201/21; E05Y 2800/11; E05Y 2201/214; E05Y 2201/418; E05Y 2400/31; E05Y 2400/36; E05Y 2400/45; E05Y 2400/44; E05Y 2400/59; E05Y 2201/218; E05Y 2201/704; E05Y 2400/20; E05Y 2900/531; E05Y 2201/434; E05C 17/003

See application file for complete search history.

(56) References Cited

U.S. PATENT DOCUMENTS 10,190,356 B2 1/2019 Watanabe
11,180,080 B2 * 11/2021 Burtch .................. B60J 5/0493

(Continued)

*Primary Examiner* — Chi Q Nguyen
(74) *Attorney, Agent, or Firm* — Dickinson Wright PLLC

(57) ABSTRACT

A method of operating a motorized flap arrangement of a motor vehicle, the flap arrangement including a flap, configured to be swiveled about a swivel axis, a drive arrangement, a drive controller, configured to control the drive arrangement, and a motion sensor arrangement, the sensor values determined by the motion sensor arrangement are checked for fulfillment of a specified actuation criterion, upon which an actuation effect manually exerted on the flap is deemed to be detected and the drive arrangement is controlled by the drive controller for motorized adjustment of the flap. The motion sensor arrangement arranged on a section of the flap facing away from the swivel axis. The actuation criterion is defined in such a way that the actuation criterion is fulfilled by a torque introduced into the flap before exceeding a breakaway torque of the flap kinematics.

20 Claims, 3 Drawing Sheets

(56) References Cited

U.S. PATENT DOCUMENTS

| | | | | |
|---|---|---|---|---|
| 11,692,386 | B2 * | 7/2023 | Herthan | E05C 17/003<br>49/31 |
| 2009/0100755 | A1 * | 4/2009 | Ishihara | E05F 15/46<br>49/31 |
| 2016/0355127 | A1 * | 12/2016 | Compton | B60Q 9/00 |
| 2017/0030737 | A1 * | 2/2017 | Elie | E05F 15/78 |
| 2017/0081894 | A1 * | 3/2017 | Kobayashi | E05F 15/659 |
| 2017/0247927 | A1 * | 8/2017 | Elie | E05F 15/611 |
| 2017/0292311 | A1 * | 10/2017 | Podkopayev | E05C 17/006 |
| 2018/0051502 | A1 * | 2/2018 | Roos | E05B 81/34 |
| 2018/0155968 | A1 * | 6/2018 | Miu | E05F 15/70 |
| 2018/0223583 | A1 * | 8/2018 | Podkopayev | F16H 37/04 |
| 2018/0238099 | A1 * | 8/2018 | Schatz | E05F 15/622 |
| 2018/0266160 | A1 * | 9/2018 | Bito | E05B 85/243 |

* cited by examiner

METHOD FOR THE OPERATION OF A MOTORIZED FLAP ARRANGEMENT

CROSS-REFERENCE TO RELATED APPLICATIONS

This application claims priority to German Patent Application No. DE 10 2021 112 656.8, filed on May 17, 2021, the disclosure of which is hereby incorporated in its entirety by reference herein.

TECHNICAL FIELD

The present disclosure to a method for the operation of a motorized flap arrangement of a motor vehicle.

BACKGROUND

Vehicles may include a flap of a flap arrangement that may form any locking element of a motor vehicle. This includes tailgates, rear lids, front hoods, in particular bonnets, doors, in particular side or rear doors or the like. The flap can be swiveled around a swivel axis between an open position and a closed position by means of flap kinematics. With the flap kinematics, a combined swivel movement and translation of the flap can also be effected, for example for flaps designed as sliding doors.

The flap is also assigned a drive arrangement, which is used for the motorized adjustment of the flap. A drive controller is used to control the drive arrangement, wherein an actuation effect of the operator manually exerted on the flap is converted into a motorized adjustment of the flap. The operator can, for example, trigger an automatic opening process of the flap by means of an initial manual pulling on the flap.

SUMMARY

The present disclosure is based on the problem of specifying a method for the operation of a motorized flap arrangement for a flap of a motor vehicle, which increases the ease of use while reducing the energy requirement.

Monitoring of flap movements near the swivel axis, for example on the drive arrangement or on a hinge arrangement of the flap kinematics, in many cases high actuation forces arise until the flap movement is detected. In the case of high flap weights, stiff kinematics or even in the case of aging effects, an actuation effect introduced on the door handle, for example, initially just leads to a slight deformation of the flap until the actuation effect is converted into a flap movement on the flap kinematics.

In one or more embodiments, it is proposed that the motion sensor arrangement is arranged on a section of the flap facing away from the swivel axis and that the actuation criterion is defined in such a way that the actuation criterion is fulfilled by the torque introduced into the flap before exceeding a breakaway torque of the flap kinematics.

The arrangement of the motion sensor arrangement on a section of the flap remote from the swivel axis enables an early and, for example, immediate detection of the actuation effect. The proposed specification of the actuation criterion avoids high actuation forces, and the adjustment is triggered, for example, before an actual flap movement takes place by means of the flap kinematics.

In another embodiment, the actuation criterion is defined on the basis of a threshold value which is representative of a torque. The threshold value can be determined in a simple way and can enable reliable detection of the actuation effect.

The monitoring for fulfillment of the actuation criterion is carried out by means of a sensor controller. This means that it is not absolutely necessary for the drive controller to be kept active to monitor the actuation effect. Rather, the drive controller may only be woken up on demand by means of a trigger signal generated by the sensor controller, whereby an overall energy saving is achieved.

Also, the monitoring for fulfillment of the actuation criterion may only be carried out on fulfillment of a trigger criterion by the sensor values detected by the motion sensor arrangement, so that an additional energy saving in the operation of the sensor controller is also achieved.

In one or more embodiments, a drive movement detected by the drive controller may be used for the specification of the actuation criterion and/or the trigger criterion. As an example, it can be determined whether a drive movement is already present before the detection of the actuation effect and the threshold value of the actuation criterion is, for example, too high.

Also, in the case of frequent triggering of the monitoring by the sensor controller in the absence of the detection of an actuation effect, the trigger threshold value may be increased to improve the energy saving.

In one or more embodiments, the motion sensor arrangement with fasteners integrated in the sensor housing. And, for example, the motion sensor arrangement may be arranged to have a high degree of robustness against the acceleration forces acting on the flap. Other arrangements of the motion sensor arrangement which ensure a high sensitivity of the motion sensor arrangement to actuation effects manually exerted on the flap are described further below.

In another embodiment, a combined arrangement of the motion sensor arrangement and a proximity sensor in the section mentioned above is provided. With this, the accuracy of the flap movements relevant for the proximity sensor can be improved. An integration of the motion sensor arrangement in the proximity sensor also enables a simplification of the installation.

According to another embodiment, a flap arrangement for carrying out the proposed method is claimed as such. Reference is made to all statements on the proposed method.

BRIEF DESCRIPTION OF THE DRAWINGS

In the following, the invention is explained in more detail on the basis of a drawing that merely represents an exemplary embodiment. In the drawings

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

A well-known method of the operating flap is disclosed in U.S. Pat. No. 10,190,356 B2 which provides, in addition to a magnetic sensor integrated in the drive, an additional motion sensor arrangement on the flap. Here, both sensors are used to detect the manually introduced actuation effect in order to determine a flap movement. One challenge here, however, is to keep the operating forces for the operator as low as possible in order to further increase comfort.

Figure 1:
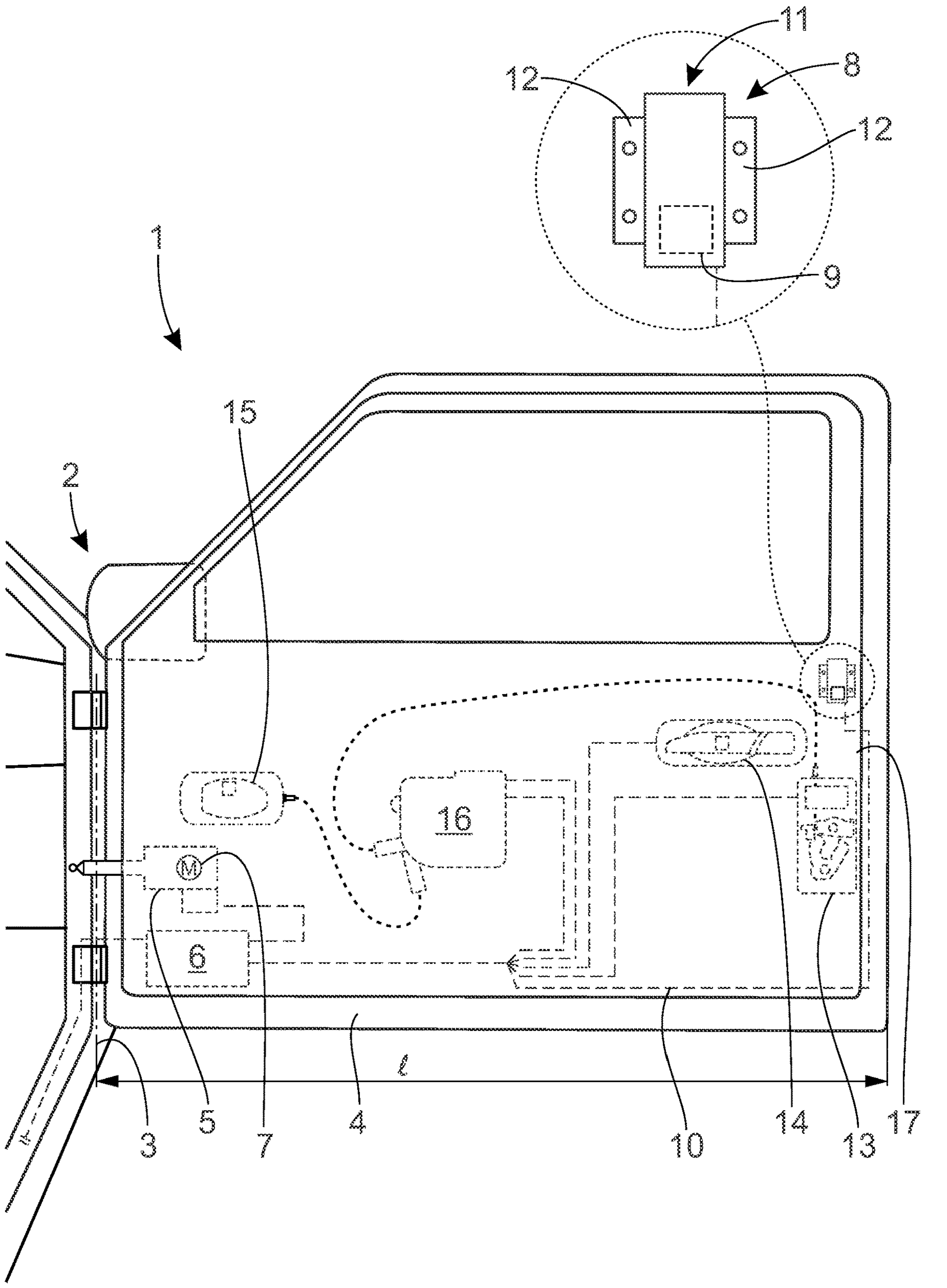
FIG. 1 shows a schematic representation of a proposed flap arrangement for carrying out the proposed method in a first embodiment.

The present disclosure relates to a method for the operation of a motorized flap arrangement 1 of a motor vehicle. The flap arrangement 1 has a flap 4 swiveling around a swivel axis 3 by means of flap kinematics 2. The components of the flap arrangement 1 which allow a movement of the flap 4 are summarized under the term flap kinematics. For possible embodiments of the flap 4, reference is made to the introductory statements, wherein FIG. 1 shows a side door of the motor vehicle as an example.

In addition to a swivel movement, a combined swivel movement and translation of the flap 4 may also be provided, wherein the flap 4 at least temporarily undergoes a translation in an opening or closing movement. The swivel axis 3 is generally a geometric swivel axis 3, which does not necessarily run on or through the components of the flap kinematics 2. FIG. 1 shows an embodiment of the flap kinematics 2 with a hinge arrangement, wherein here the swivel axis 3 runs through the hinge arrangement, again by way of example.

The flap arrangement 1 has a drive arrangement 5 assigned to the flap 4 and a drive controller 6 for controlling the drive arrangement 5. The drive arrangement 5 has control electronics for the implementation of the motorized adjustment of the flap 4. In particular, a driver unit and power electronics are provided for supplying an electric drive motor 7 of the drive arrangement 5 with electrical power, such as by means of pulse width modulation.

The flap 4 has a motion sensor arrangement 8 for determining sensor values. The sensor values may be representative of a position, a speed and/or an acceleration of the motion sensor arrangement 8. The sensor values determined by means of the motion sensor arrangement 8 are checked in a manner that has yet to be explained for fulfillment of a predetermined actuation criterion.

On fulfilment of the actuation criterion, an actuation effect manually exerted on the flap 4 is deemed to be detected and the drive arrangement 5 is controlled by means of the drive controller 6 for motorized adjustment of the flap 4. The motorized adjustment may be an opening movement of the flap 4, and the flap 4 is transferred in a motorized manner from a closed position which is not shown into the open position shown in FIG. 1. A closing movement of the flap 4 from the open position into the closed position is also conceivable. Furthermore, an adjustment of the flap 4 from and/or to intermediate positions between the closed position and the open position can be carried out.

The operator of the motor vehicle can thus trigger a motorized adjustment of the flap 4 by an actuation effect manually introduced into the flap 4, such as pulling or pushing the flap 4. A further requirement for the motorized adjustment may be unlocking of the flap arrangement 1, for example by means of the detection of an electronic key or the like, or also by detection of an approach of the operator by means of sensors.

In one or more embodiments, the motion sensor arrangement 8 is arranged on a section of the flap 4 facing away from the swivel axis 3 and that the actuation criterion is defined in such a way that the actuation criterion is fulfilled by the torque introduced into the flap 4 before exceeding a breakaway torque of the flap kinematics 2.

As an example, the section of the flap 4 facing away from the swivel axis 3 is a section that has a distance of at least one third, preferably at least half, of the extension 1 of the flap 4 to the swivel axis 3. The extension of the flap is to be understood as the maximum distance, in a direction perpendicular to the swivel axis 3, from the swivel axis 3 to an end of the flap 4 situated distal to the swivel axis.

In one or more embodiments, the motion sensor arrangement 8 is arranged on an end section of the flap 4 facing away from the swivel axis 3. Here, the end section has a distance of at least three-quarter, such as at least 80%, or at least 90%, of the extension 1 of the flap 4 to the swivel axis 3. The arrangement of the end section of the flap 4 facing away from the swivel axis 3 also does not necessarily mean an arrangement on the outer surface of the flap.

Rather, the integration of the motion sensor arrangement 9 in the flap 4 may be provided, wherein, for example, the motion sensor arrangement 9 is arranged at the greatest possible distance from the swivel axis 3 within the flap 4. The drive arrangement 5, on the other hand, is arranged on the end section of the flap 4 facing the swivel axis 3.

By means of the definition of the actuation criterion, it is achieved that the actuation effect is considered to be detected even before the actual movement of the flap kinematics 2, in this case a swiveling of the hinge arrangement. As an example, a small elastic deformation of the flap 4 on the section of the flap 4 facing away from the swivel axis 3 without a flap movement by means of the flap kinematics 2 is sufficient to trigger the motorized adjustment. The breakaway torque is understood here to mean the minimum torque which must be applied at the start of the swiveling of the flap 4 around the swivel axis 3 by means of the flap kinematics 2. The breakaway torque is caused in particular by friction effects of the flap kinematics 2, the drive arrangement 5 and other components, such as door catches or the like.

As an example, the actuation criterion is defined in that the sensor values determined by the motion sensor arrangement 8, such as sensor values for a flap acceleration, a flap angle and/or a flap displacement, exceed a predetermined threshold value. A flap acceleration may be understood to mean an angular acceleration of the flap 4 around the swivel axis 3, which is determined, for example, by an acceleration sensor. A position sensor can also be used, by means of which the flap acceleration, the flap angle and/or the flap displacement can be inferred. The flap angle is understood here to mean a rotation angle of the motion sensor arrangement 8 relative to the swivel axis 3. The flap displacement here refers to the distance moved by the motion sensor arrangement 8 with the actuation effect. The threshold value represents a torque acting on the flap below the breakaway torque of the flap kinematics 2.

In one or more embodiments, it is provided that the motion sensor arrangement 8 has a sensor controller 9, by means of which the sensor values determined by the motion sensor arrangement 8 are checked for fulfillment of the actuation criterion. The sensor controller 9 therefore undertakes at least part of the evaluation, such as the entire evaluation, of the sensor values detected by the motion sensor arrangement 8. Upon fulfilment of the actuation criterion, a trigger signal for triggering the motorized adjustment is transmitted to the drive controller 6 by means of the sensor controller 9. There may be a standby mode and a working mode of the drive controller 6, wherein the drive controller 6 is transferred by means of the trigger signal from the standby mode to the working mode. The standby mode has a lower power requirement than the working mode.

The check of the sensor values for fulfillment of the actuation criterion by means of the sensor controller 9 may be triggered on fulfilling a trigger criterion by the sensor values, such as exceeding a trigger threshold by the sensor values. As an example, a standby mode and a working mode of the sensor controller 9 are also provided here. The sensor controller 9 has, for example, a comparator circuit that undertakes a check of the trigger criterion and transfers the sensor controller from the standby mode to the working mode on fulfilling the trigger criterion. The actual monitoring of the actuation criterion by means of the sensor controller 9 thus takes place, for example, only when a movement of the end section of the flap 4 is indicated by the sensor values.

As FIG. 1 further shows, the motion sensor arrangement 8 is supplied with electrical energy via an electrical supply line 10 between the drive controller 6 and the motion sensor arrangement 8. As an example, the mentioned trigger signal is also transmitted via the supply line 10. For this purpose, the supply line may have a separate signal channel. The sensor values can also be transmitted via the supply line 10, in particular in a further embodiment in which the drive controller 6 carries out the checking of the actuation criterion.

In one or more embodiments, the proposed actuation criterion can be specified depending on the boundary conditions, for example by determining the breakaway torque and the deformability of the flap, for example during assembly of the flap arrangement 1. As an example, flap movement possibly generated by the manual actuation effect is monitored by means of the drive controller 6, and that the actuation criterion and/or the trigger criterion is specified on the basis of the detected flap movement. If a flap movement already occurs with the manual actuation effect before the actuation criterion is fulfilled, the actuation criterion can be changed in such a way that the actuation criterion is now met by the torque introduced into the flap 4 before exceeding a breakaway torque of the flap kinematics 2. The detected flap movement is therefore used to readjust the actuation criterion, so that the proposed conditions for the actuation criterion can also be adhered to during operation.

The flap movement can be detected by means of a sensor arrangement, which is not shown here and which is assigned to the drive arrangement 5 and/or the flap kinematics 2. As an example, this is a Hall sensor arrangement which, for example, is assigned to the hinge arrangement or a drive shaft of the drive motor 7 of the drive arrangement 5. It is also conceivable that the flap movement is detected on the basis of drive values of the drive arrangement 5, such as a generator voltage occurring here on the drive motor 7. Criteria such as threshold values or the like may be again specified for detecting the flap movement. For example, passing through one or more Hall edges detected by means of the Hall sensor arrangement and/or exceeding a specified minimum voltage by the generator voltage is considered to be a detected flap movement.

In one or more embodiments, upon detection of a flap movement on the flap kinematics 2 which precedes fulfilling the actuation criterion, the actuation criterion is changed, such as the threshold value is reduced. For example, the actuation criterion is changed in a predefined way. For example, if a preceding flap movement is detected, the threshold value is reduced by a predetermined value.

According to a further, embodiment, the trigger criterion is changed on fulfilling the trigger criterion and in the absence of a subsequent fulfillment of the actuation criterion, the trigger threshold value may be increased. A change can also only be made in the event of repeated failure to meet the actuation criterion. Too frequent activation of the sensor controller 9 is thereby prevented.

FIG. 1 also shows that the motion sensor arrangement 8 may be fitted with a sensor housing 11, which has fasteners 12 formed integrally with the sensor housing 11. The motion sensor arrangement 8 is arranged on the flap by means of the fasteners 12. Increased stability of the motion sensor arrangement 8 against high accelerations, which can occur, for example, when the flap 4 is slammed, can be achieved by means of the fasteners 12 implemented integrally with the sensor housing 11.

As an example, the sensor housing 11 is formed by an overmolding and in particular by a plastic overmolding. The sensor housing 11 can accommodate the sensors of the motion sensor arrangement 8 as well as the sensor controller 9. In one embodiment, the sensor housing 11 is an additional enclosure of a sensor present as an integrated component.

As an example, the motion sensor arrangement 8 is arranged on a motor vehicle lock 13 of the flap arrangement 1 or in the motor vehicle lock 13, whereby a further integration of the components of the flap arrangement 13 and thus a facilitated assembly is achieved. As can be seen from FIG. 1, the motor vehicle lock 13 is also arranged in a well-known manner on the end section of the flap 4 facing away from the swivel axis 3.

Also, the motion sensor arrangement 8 may be arranged on or in a control element, such as a door handle, of the flap arrangement 1. As an example, an outer door handle 14 and an interior door handle 15 are provided as control elements, wherein the motion sensor arrangement 8 is arranged on the outer door handle 14 arranged on the end section of the flap 4 facing away from the swivel axis 3. Furthermore, it is conceivable to arrange the motion sensor arrangement 8 on or in a door control unit 16, wherein the door control unit 16 is positioned in the section facing away from the swivel axis, such as in the end section.

Further possible arrangements of the motion sensor arrangement 8, which can ensure high sensitivity for detecting the actuation effect, are given by a boundary surface 17 of the flap designed as a side door 4 to the B-pillar or, for flaps 4 designed as rear doors, to the C-pillar of the motor vehicle.

Figure 2:
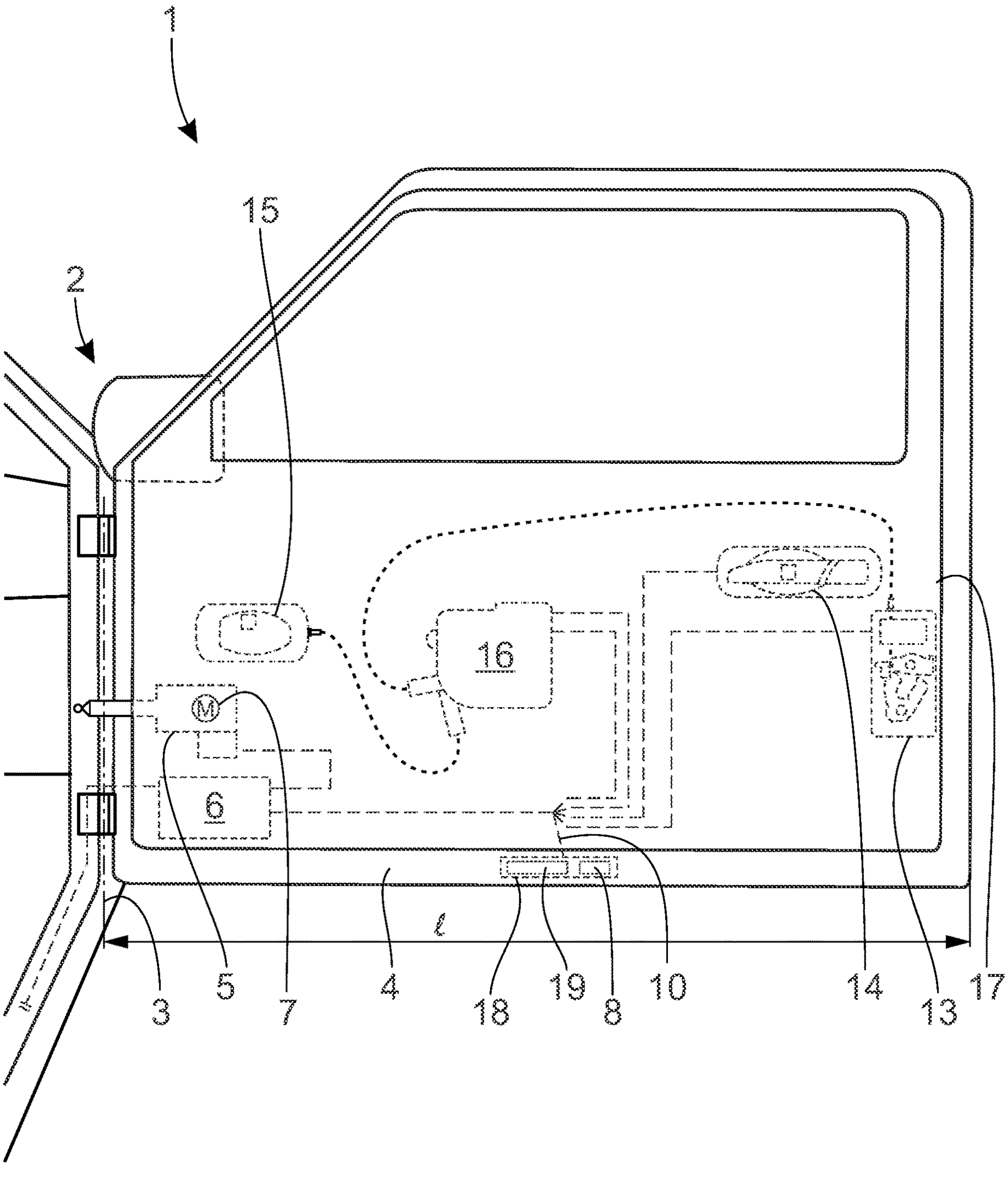
FIG. 2 shows a schematic drawing of a proposed flap arrangement for carrying out the proposed method in a second embodiment.

In a further embodiment shown in FIG. 2, a proximity sensor 18 is arranged on the section of the flap 4 facing away from the swivel axis 3. As proximity sensor 18, such as a radar sensor for the detection of objects outside and/or inside the motor vehicle is provided. The proximity sensor 18 may also comprise a capacitive sensor, an optical sensor, an ultrasonics sensor or the like, which are configured to determine proximity sensor values.

As an example, the motorized adjustment of the flap 4 is performed on basis of proximity sensor values of the proximity sensor 18, wherein for example the motorized adjustment may be triggered, suppressed or altered depending on the proximity sensor values. It is conceivable that the proximity sensor 18 is provided for detection of an approach of the operator in the course of the triggering and/or of an anti-pinch protection during a closing action of the flap 4. The proximity sensor 18 may be used for an obstacle detection in the course of the motorized adjustment, wherein for example the flap 4 is stopped or reversed in case an obstacle is detected in the adjustment path of the flap 4. Here, the proximity sensor 18 is provided in a lower part of the flap 4, such that objects close to the ground may be detected.

In one or more embodiments, the motorized adjustment of the flap is performed on basis of proximity sensor values of the proximity sensor 18 and sensor values determined by means of the motion sensor arrangement 8. With the arrangement of the flap 4, the proximity sensor 18 is also moved during actuation of the flap 4, such that the flap position, here the flap angle, may also be considered in the analysis of the proximity sensor values. With the combined arrangement of proximity sensor 18 and motion sensor arrangement 8 in the section facing away from the swivel axis 3, the flap movement may also be determined particularly precisely with relation to the proximity sensor 18, wherein in particular possible angular deviations due to a deformation of the flap 4 may be minimized.

In one or more embodiments, as shown in FIG. 2, the motion sensor arrangement 8 is integrated in the proximity sensor 18. Herein, the motion sensor arrangement 8 and the proximity sensor 18 may have a common housing and/or a common circuit board. Besides the improvement in accuracy of the detection of the flap movement, this embodiment provides for a simplification of the installation.

As already mentioned, the motion sensor arrangement 8 may include an acceleration sensor, wherein the sensor values can be representative of an acceleration of the end section of the flap 4. A rotational movement of the end section may be carried out via an elastic deformation of the flap 4 as a result of the actuation effect, so that the motion sensor arrangement 8 may have a gyro sensor for detecting the actuation effect.

According to a further teaching, which has independent significance, the mentioned flap arrangement 1 for the implementation of the proposed method is disclosed herein. The motion sensor arrangement 8 of the flap 4 is arranged here on a section, such as an end section, of the flap 4 facing away from the swivel axis 3. The flap arrangement 1 may include control electronics which are set up to carry out the check of the actuation criterion. Reference is made to all the statements on the proposed method.

Figure 3:
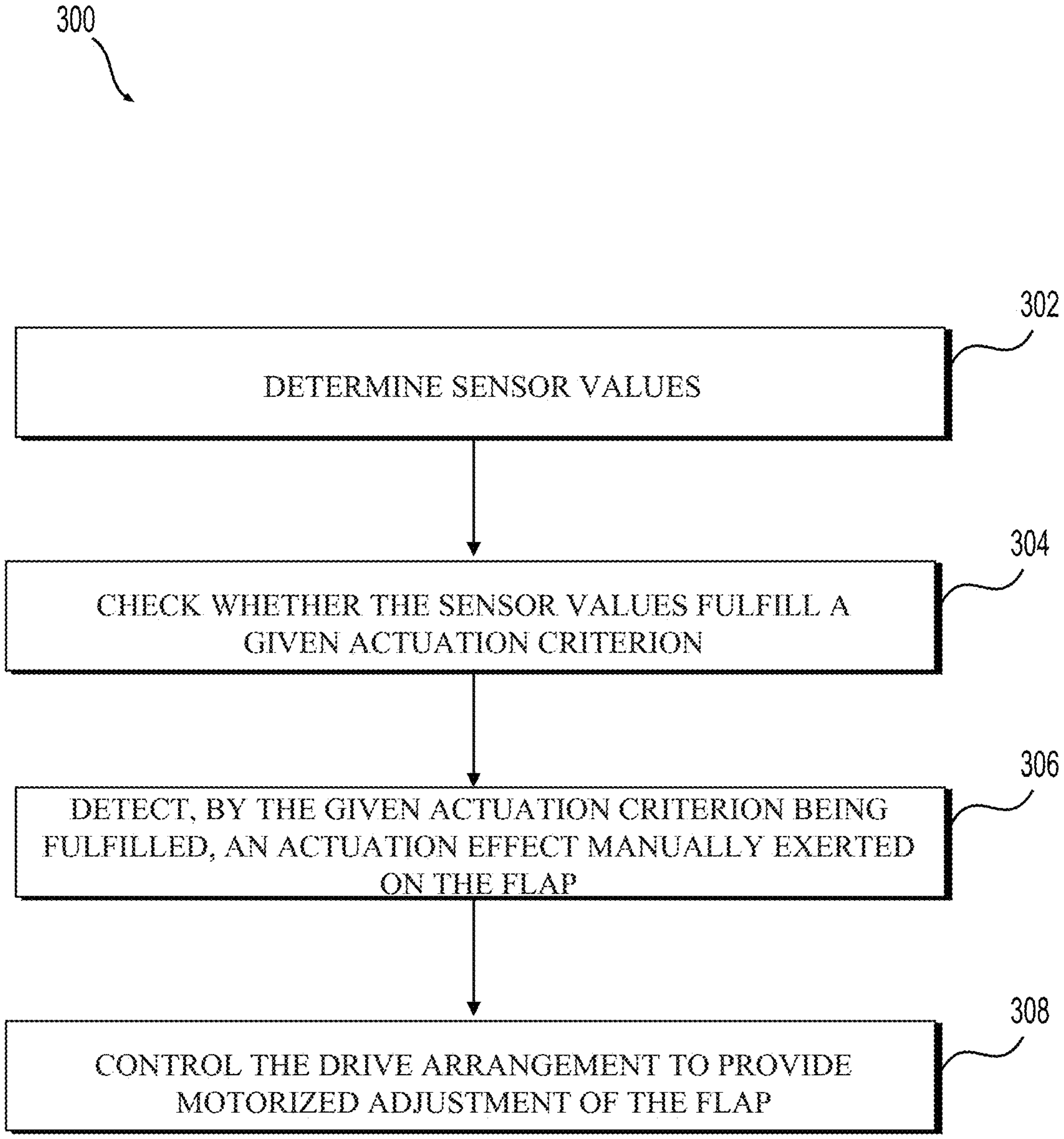
FIG. 3 depicts a flowchart of a method of operating a motorized flap arrangement of a motor vehicle.

FIG. 3 depicts a flowchart 300 of a method of operating a motorized flap arrangement of a motor vehicle, according to an example embodiment. As shown in FIG. 3, the method of flowchart 300 begins at step 302. In step 302, determine sensor values.

At step 304 in flowchart 300, check whether the sensor values fulfill a given actuation criterion.

At step 306 in flowchart 300, detect, by the given actuation criterion being fulfilled, an actuation effect manually exerted on the flap.

At step 308 in flowchart 300, control the drive arrangement to provide motorized adjustment of the flap.

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

LIST OF REFERENCE NUMBERS

1 flap arrangement
2 flap kinematics
3 swivel axis
4 flap
5 drive arrangement
6 drive controller
7 drive motor
8 motion sensor arrangement
9 sensor controller
10 electrical supply line
11 sensor housing
12 fasteners
13 motor vehicle lock
14 outer door handle
15 interior door handle
16 door control unit
17 boundary surface While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

The invention claimed is:

1. A method of operating a motorized flap arrangement of a motor vehicle, wherein the motorized flap arrangement includes a flap, configured to be swiveled around a swivel axis by flap kinematics, a drive arrangement assigned to the flap, a drive controller, configured to control the drive arrangement, and a motion sensor arrangement, the method comprising:
- determining, by the motion sensor arrangement, sensor values;
- checking whether the sensor values fulfill a given actuation criterion;
- detecting, by the given actuation criterion being fulfilled, an actuation effect manually exerted on the flap; and
- controlling, by a drive controller, the drive arrangement to provide motorized adjustment of the flap,
- wherein the motion sensor arrangement is arranged on an end section of the flap facing away from the swivel axis and the actuation criterion is defined so that the actuation criterion is fulfilled by a torque applied to the flap before exceeding a breakaway torque of the flap kinematics.

2. The method of claim 1, wherein the sensor values are representative of a flap acceleration, and the detecting step includes the sensor values exceeding a specified acceleration threshold value indicative of a torque acting on the flap being less than the breakaway torque of the flap kinematics.

3. The method of claim 1, further comprising:
- transmitting a trigger signal from a sensor controller to the drive controller to trigger the controlling step, wherein the motion sensor arrangement includes the sensor controller.

4. The method of claim 3, further comprising:
- fulfilling a trigger criterion based on the sensor values, wherein the checking step is triggered in response to the fulfilling step.

5. The method of claim 4, wherein the fulfilling step is accomplished by the sensor values exceeding a trigger threshold value.

6. The method of claim 1, further comprising:
- supplying, by an electrical supply line disposed between the drive controller and the motion sensor arrangement, electrical energy to the motion sensor arrangement.

7. The method of claim 6, further comprising:
transmitting a trigger signal via the electrical supply line from a sensor controller to the drive controller, to trigger the controlling step.

8. The method of claim 1, further comprising:
detecting, by the drive controller and the motion sensor arrangement, a flap movement; and
monitoring, by the drive controller and the motion sensor arrangement, movement of the flap.

9. The method of claim 8, further comprising:
changing the actuation criterion in response to detecting the movement of the flap; and
fulfilling the actuation criterion, wherein the changing step is performed prior the fulfilling step.

10. The method of claim 9, wherein the changing the actuation criterion step includes reducing a trigger threshold.

11. The method of claim 8, wherein the motion sensor arrangement includes a Hall sensor arrangement assigned to the drive arrangement.

12. The method of claim 1, further comprising:
fulfilling a trigger criterion based on the sensor values; and
changing the trigger criterion in response to the fulfilling the trigger criterion step and absence of subsequently fulfilling the actuation criterion.

13. The method of claim 12, wherein the changing the trigger criterion step includes increasing a trigger threshold.

14. The method of claim 1, further comprising:
manually actuating the flap to produce a flap movement; and
monitoring, by the drive controller, a generator voltage of the drive arrangement.

15. A flap arrangement for use in a motor vehicle, the flap arrangement comprising:
a flap configured to be swiveled about a swivel axis, the flap including an end section facing away from the swivel axis;
flap kinematics configured to swivel the flap about the swivel axis;
a drive arrangement assigned to the flap; and
a motion sensor arrangement disposed on the end section of the flap and configured to generate sensor values indicative of movement of the flap; and
a drive controller configured to responsive to receiving the sensor values from the motion sensor arrangement and the sensor values fulfilling an actuation criterion, command the drive arrangement to provide motorized adjustment of the flap, wherein the actuation criterion is defined so that the actuation criterion is met in response to a torque applied to the flap exceeding a breakaway torque of the flap kinematics.

16. The flap arrangement of claim 15, wherein the motion sensor arrangement is arranged on or in a motor vehicle lock of the flap arrangement, or on or in a control element of the flap.

17. The flap arrangement of claim 15, further comprising:
a proximity sensor arranged on a section of the flap facing away from the swivel axis.

18. The flap arrangement of claim 15, wherein the motion sensor arrangement includes at least one of an acceleration sensor and a gyro sensor.

19. The flap arrangement of claim 15, wherein the motion sensor arrangement includes a sensor housing and fasteners, the fasteners integral to the sensor housing, and wherein the motion sensor arrangement is arranged on the flap by the fasteners.

20. The flap arrangement of claim 19, wherein the sensor housing is overmolded.

* * * * *